(No Model.)
E. D. MELLEN.
PROCESS OF RECOVERING ALKALI AND GLYCERINE FROM SPENT SOAP LYE.
No. 422,140. Patented Feb. 25, 1890.
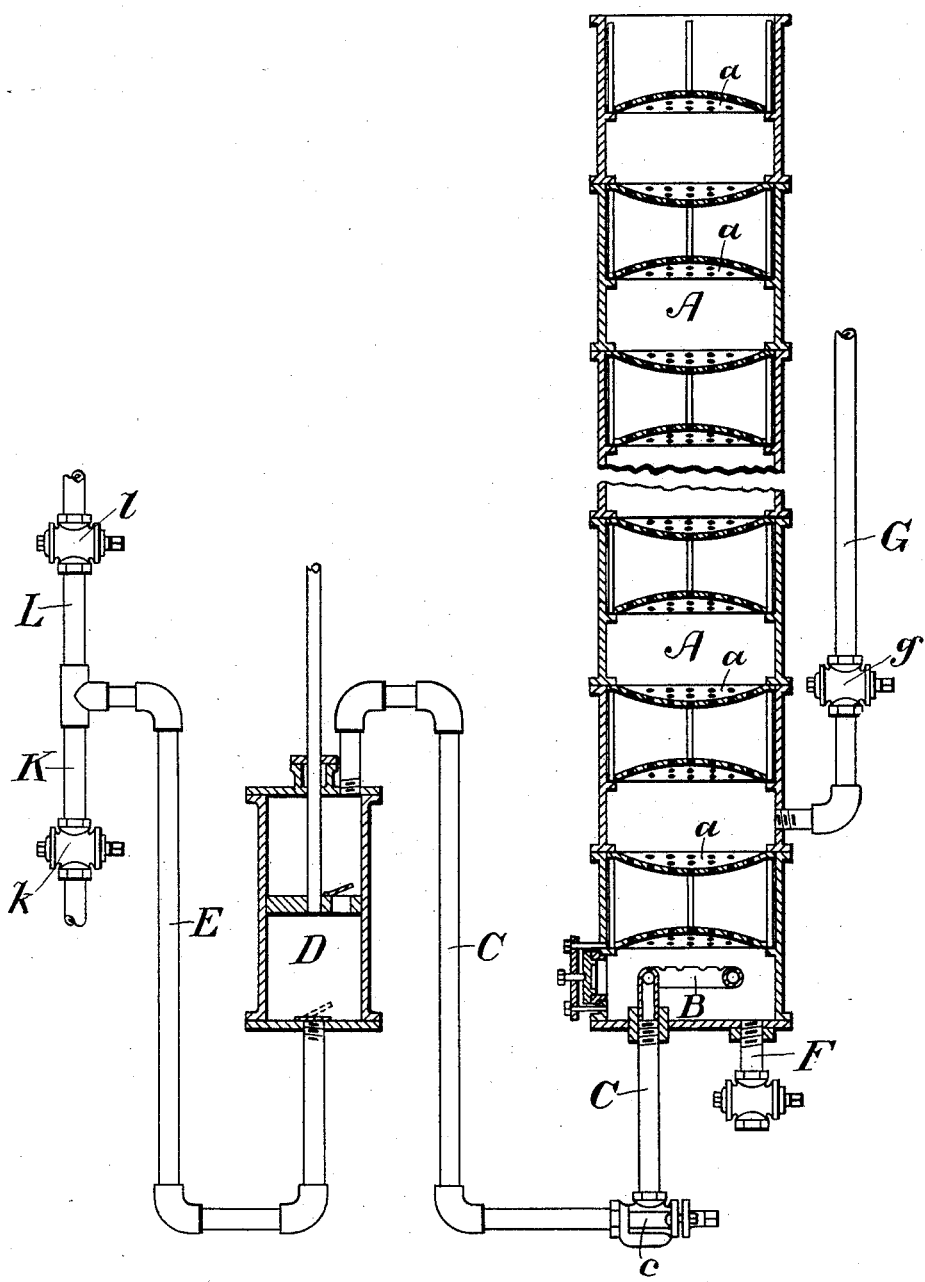
Witnesses
Albert E. Leach
M. H. Thompson
Inventor
Edwin D. Mellen
by Wm. B. H. Dowse
Atty.

UNITED STATES PATENT OFFICE.

EDWIN D. MELLEN, OF CAMBRIDGE, MASSACHUSETTS.

PROCESS OF RECOVERING ALKALI AND GLYCERINE FROM SPENT SOAP-LYE.

SPECIFICATION forming part of Letters Patent No. 422,140, dated February 25, 1890.

Application filed September 20, 1889. Serial No. 324,544. (No specimens.)

*To all whom it may concern:*

Be it known that I, EDWIN D. MELLEN, a citizen of the United States, residing at Cambridge, in the county of Middlesex and Commonwealth of Massachusetts, have invented a certain new and useful Process for the Recovery of Alkali and Glycerine in Soap-Lye, of which I declare the following to be a full specification.

The accompanying drawing represents, in sectional elevation, a form of apparatus to be employed in carrying out my process.

My invention consists of an improved process for the ready and cheap recovery of both alkali and glycerine from the waste lyes in soap-making, the details of which process are hereinafter given.

It is well known that waste lyes from soap-making commonly contain alkali, glycerine, and salt. In the processes ordinarily employed hitherto for the recovery of the glycerine the alkali is entirely lost or imperfectly recovered at great expense, while the presence of salt renders the recovery of the glycerine very difficult.

My process consists, first, in the use of an excess of caustic alkali, preferably soda, in the treatment of the soap-stock, sufficiently larger than the amount ordinarily required to saponify the fat, so that the soap may be be precipitated by the alkali without the addition of salt. To do this I preferably proceed in the following way: The tallow or other soap-stock containing glycerine is melted in an ordinary soap-kettle with water and a solution of caustic soda of 30° Baumé added in the usual proportion, and the soap boiled in the common way; but a quantity of the soda solution is finally added sufficient to cause the separation of the soap. The soap-lyes thus obtained, after the removal of the soap in the ordinary manner, contain glycerine, sodium carbonate, sodium hydrate, water, and various impurities which were present in the fat and the alkali, but are practically free from salt.

My process for the recovery of the alkali depends upon the comparative insolubility of bicarbonate of soda in glycerine and mixtures of glycerine and water.

I proceed as follows: The lyes are evaporated to preferably about one-seventh of the volume of lye as taken from the soap, or until they contain about fifty per cent. of glycerine. They are then pumped through a pipe G into a cylindrical tower A, consisting, preferably, of a series of cylinders superimposed one upon another in the manner illustrated, and containing at intervals perforated shelves $a$ of the shape of a spherical segment. The purpose of this apparatus is for the saturation of the lyes with carbonic-acid gas.

C is the gas-pipe entering the bottom of the tower and terminating within it in the rose or perforated circular pipe B.

D is a pump or blower of any approved construction for delivering a constant quantity of gas through the pipe C and rose B into the concentrated soap-lyes contained in the tower. I preferably generate the gas to be used for this purpose by the action of rosin or fatty acids upon bicarbonate of soda; but the gas may be obtained in any desired manner, or furnace-gases may be employed.

In the drawing, the gas-pipe E, leading to the pump or blower, connects with the two pipes K and L, one of which leads to a gas-generator and the other to a furnace, so that by the cocks $k$ and $l$ either furnace-gas or carbonic-acid gas obtained directly from the generator may be pumped into the tower A and forced through the soap-lyes, thoroughly saturating the same. By this treatment the carbonate and caustic soda are transformed into the bicarbonate of sodium, which separates, falls to the base of the tower, and can be freed from adhering lye by pressing or treatment in a centrifugal machine. By this means the soda is largely recovered in the above-mentioned form. The liquid remaining after the removal of as much as possible of the sodium as bicarbonate is then further evaporated, and the result is marketable as a crude glycerine, or it can be further purified by distillation with steam or hot air.

I claim—

The herein-described process of preparing soap and treating the lye, the same consisting, first, in precipitating the soap from the soap-stock by an excess of aqueous solution of alkali, whereby the resulting lye is obtained free from salt, and, second, in saturating the concentrated lye thus obtained with carbonic-acid gas, whereby the alkali is separated as a bicarbonate and glycerine left in solution, substantially as set forth.

In witness whereof I have hereunto set my hand.

EDWIN D. MELLEN.

Witnesses:
WM. B. H. DOWSE,
ALBERT E. LEACH.